Sept. 8, 1964  B. GLYNN  3,147,507

AUTOMOBILE WINDSHIELD WIPER CLIP

Filed Oct. 14, 1963

INVENTOR
BRIAN GLYNN
ATTYS.

United States Patent Office 3,147,507
Patented Sept. 8, 1964

3,147,507
AUTOMOBILE WINDSHIELD WIPER CLIP
Brian Glynn, Dundas, Ontario, Canada, assignor to Tridon Manufacturing Limited, Hamilton, Ontario, Canada
Filed Oct. 14, 1963, Ser. No. 315,918
4 Claims. (Cl. 15—250.32)

My invention relates to improvements in automobile windshield wipers and the object of the invention is to provide a novel clip arrangement mounted upon the face of the usual windshield wiper pressure superstructure provided to support the usual squeegee wiper blade; the clip being arranged for insertion within a clevis member carried upon the free end of a known windshield wiper arm assembly and wherein the clevis member has parallel flat side flanges between which the clevis pin extends.

This invention is more particularly provided for use in conjunction with a windshield wiper pressure superstructure formed of moulded plastic material, such as disclosed in my Continuation-in-Part patent application "Windshield Cleaners," Serial No. 287,573, filed June 13, 1963, and the object of the invention is to furnish a clip integrally formed of a block of plastic material possessing a certain degree of bendable resiliency, the clip being arranged to be received in the space between the side flanges of the clevis member and locked for swinging movement about the clevis pin.

A further object of the invention is to form the clip with a slot which is downwardly directed from the top face of the clip for reception of the clevis pin, the inner end of the slot terminating in a clevis pin seat; the clip being furnished with a resilient tongue extending inwardly of the slot from one of the sides of the slot and having its inner end positioned in front of the seat to normally retain the clevis pin in position upon the seat.

With the foregoing and other objects in view as shall hereinafter appear, the invention consists of a novel clip for attaching an automobile windshield wiper to a windshield wiper supporting arm, the clip being formed and arranged all as hereinafter more particularly described and illustrated in the accompanying drawing, in which.

Figure 1:
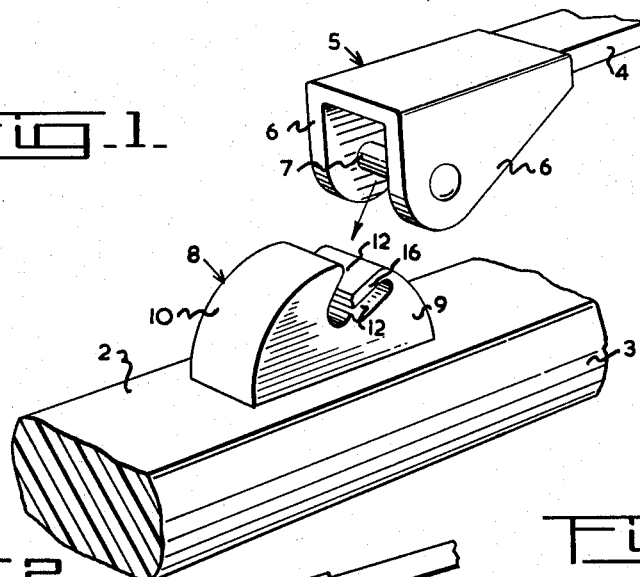
FIG. 1 is a perspective view of the clip attached to a fragmentary portion of a windshield wiper pressure superstructure, together with a clevis member carried upon the end of a windshield wiper supporting arm.

The clip is preferably integrally formed of a moulded block of plastic material having a certain degree of bendable resiliency, and in practice is rather small as it is dimensioned to be mounted upon a windshield pressure superstructure of standard size. Referring to FIG. 1, the portion of the face 2 of the pressure superstructure 3, upon which the clip is mounted, is about one-half inch wide and the standard windshield wiper supporting arm 4 less than one-quarter inch wide.

The standard type clevis member 5 mounted upon the free end of the arm 4 is of U-shaped form having a pair of spaced apart flat parallel side flanges 6 and between which a cylindric clevis pin 7 extends intermediately of the width and length of the flanges.

The clip 8 preferably consists of a moulded block of plastic material, suitably secured to the face 2 of the pressure superstructure, and formed with a pair of parallel flat side faces 9 and a curved top face 10, the width of the clip being such that it fits relatively closely but freely within the space between the flat side flanges 6 of the clevis member whereby the pressure superstructure 2 may freely rock in relation to the supporting arm 4.

For reception of the clevis pin 7 the clip block 8 is formed with a slot 12 opening downwardly of the block from its curved face 10 and also extending transversely of the width of the block and opening into the side faces 9 of the block. The bottom of the slot terminates in a clevis pin seat 13 having a semi-cylindric face of approximately the same diameter as the diameter of the clevis pin 7. The slot is preferably inclined in relation to the base of the clip; the distance between the sides 14 and 15 of the slot being greater than the diameter of the clevis pin 7, the sides of the slot diverging outwardly from the inner end of the slot.

To retain the inserted clevis pin 7 in place upon the slot seat 13 an integral tongue 16 is provided to protrude into the slot 12, the tongue being attached to the portion of the clip at the outer end of the side 15 of the slot and arranged in spaced relation to the sides 14 and 15 of the slot. The tongue is of such a length and so positioned within the slot 12 that its inner end is normally in front of and slightly spaced away from a clevis pin resting upon the seat 13, and whereby the tongue retains the clevis pin in place, as shown in FIG. 3.

Figure 2:
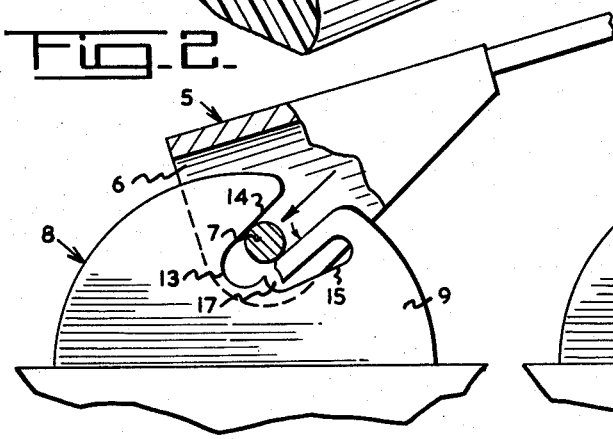
FIG. 2 is a side elevational view of the clip and clevis member, partly broken away, and showing the pin of the clevis initially inserted into the slot in the clip.

As the clip block is formed of a material having a degree of resiliency, the tongue is swingable or bendable against its resiliency upon insertion of a clevis pin 7 into the slot 12; downward movement of the pin pushing the inner end of the tongue into a recess 17 formed in the inner end of the side 15 of the slot, as shown in FIG. 2. Upon the pin reaching the seat 13 and clearing the end of the tongue, the tongue under its resiliency returns to the pin retaining position shown in FIG. 3.

Figure 3:
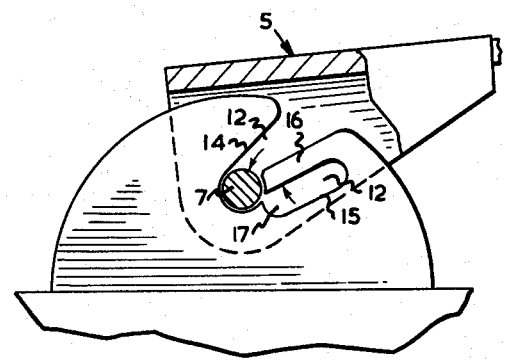
FIG. 3 is a similar view to FIG. 2 and showing the pin of the clevis member completely inserted within the slot.

To detach the clip from the clevis member 5, referring to FIG. 3, the pressure superstructure 2 and the clip is swung in a clockwise direction about the clevis pin 7 to a position wherein the tongue is sufficiently exposed to be manually pushed downwardly away from in front of the clevis pin, as shown in FIG. 2, and whereby the clevis pin may be withdrawn.

Figure 4:
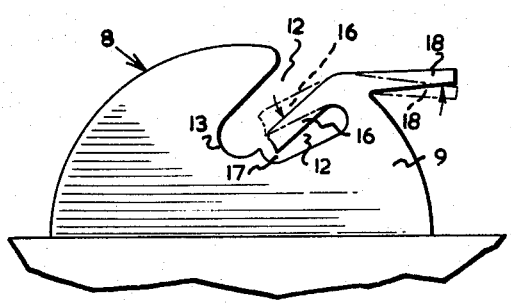
FIG. 4 is a side elevational view of a modified form of clip.

FIG. 4 illustrates a modification wherein the tongue 16 is formed with an outwardly protruding extension 18, upward manual movement of the extension swinging the tongue from the normal position shown in dotted lines to the clevis pin release position shown in full lines.

What I claim as my invention is:

1. An attachment clip for connecting a windshield wiper to a supporting arm mounted for oscillation and having a free end terminating in a clevis member formed with spaced apart flat side flanges and between which flanges a cylindric clevis pin extends; said clip comprising a solid block of plastic material possessing a degree of bendable resiliency and secured to the windshield wiper, the block being of a width receivable within the space between the side flanges of the clevis member, a slot extending inwardly of the block from the top face of the block and terminating in an inner seat for seating reception of a clevis pin upon insertion of the block into the space between the side flanges of a clevis member, the slot also extending transversely of the width of the block and opening into the side faces of the block, a resilient tongue for retention of a clevis pin against outward movement along the slot when the pin is seated upon said inner seat, the tongue protruding into the slot from the top face of the block and so positioned that its inner end is located adjacently to and in front of the seat, the tongue along its length being spaced from one side of the slot and divertable against its resiliency toward said side for removal of its inner end from out of position in front of said seat.

2. An attachment clip as defined in claim 1, wherein the clevis pin receiving seat has a semi-cylindric face of approximately the same diameter as the diameter of the clevis pin, the distance between the sides of the slot being greater than the diameter of the seat, the tongue being integral with the portion of the block bounding one side of the slot and when in position with its inner end located in front of the seat, said inner end being spaced from either side of the slot a distance less than the diameter of the clevis pin.

3. An attachment clip as defined in claim 2, wherein the sides of the slot diverge outwardly from the inner end of the slot, one of the sides of the slot being recessed for reception of the end of the tongue in movement of said end out of position in front of said seat.

4. An attachment clip as defined in claim 3, wherein said tongue is formed with a manually moveable extension portion protruding from the block, manual pressure upon the extension portion diverting the end of the tongue from out of position in front of said seat.

References Cited in the file of this patent

German printed application A 21,858, printed October 25, 1956.